United States Patent [19] [11] 4,186,275
Burns [45] Jan. 29, 1980

[54] INITIAL RATE OVERRIDE CIRCUIT

[75] Inventor: Robert V. Burns, Tinley Park, Ill.

[73] Assignee: GTE Automatic Electric Laboratories Incorporated, Northlake, Ill.

[21] Appl. No.: 930,304

[22] Filed: Aug. 2, 1978

[51] Int. Cl.² .......................................... H04M 17/02
[52] U.S. Cl. .................................... 179/6.3 R; 179/6.5
[58] Field of Search ...................... 179/6.3 R, 6.4, 6.5; 307/252 R

[56] References Cited

U.S. PATENT DOCUMENTS

| 3,409,739 | 11/1968 | Joel, Jr. | 179/6.3 R |
| 3,435,146 | 3/1969 | Busala et al. | 179/6.3 R |
| 3,760,101 | 9/1973 | Burns | 179/6.3 R |
| 3,798,470 | 3/1974 | Burns et al. | 307/252 R |
| 3,881,062 | 4/1975 | Beeman et al. | 179/6.3 R |
| 3,890,468 | 6/1975 | Burns et al. | 179/6.5 |

*Primary Examiner*—Gerald Brigance
*Attorney, Agent, or Firm*—Gregory G. Hendricks

[57] ABSTRACT

A circuit which overrides the initial rate circuit included in a coin telephone, to allow the central office to perform coin collect and refund operations independent of whether or not the initial rate has been deposited. This circuit operates in response to coin battery applied by the central office to operate a rate relay which connects the included coin relay to the central office.

14 Claims, 1 Drawing Figure

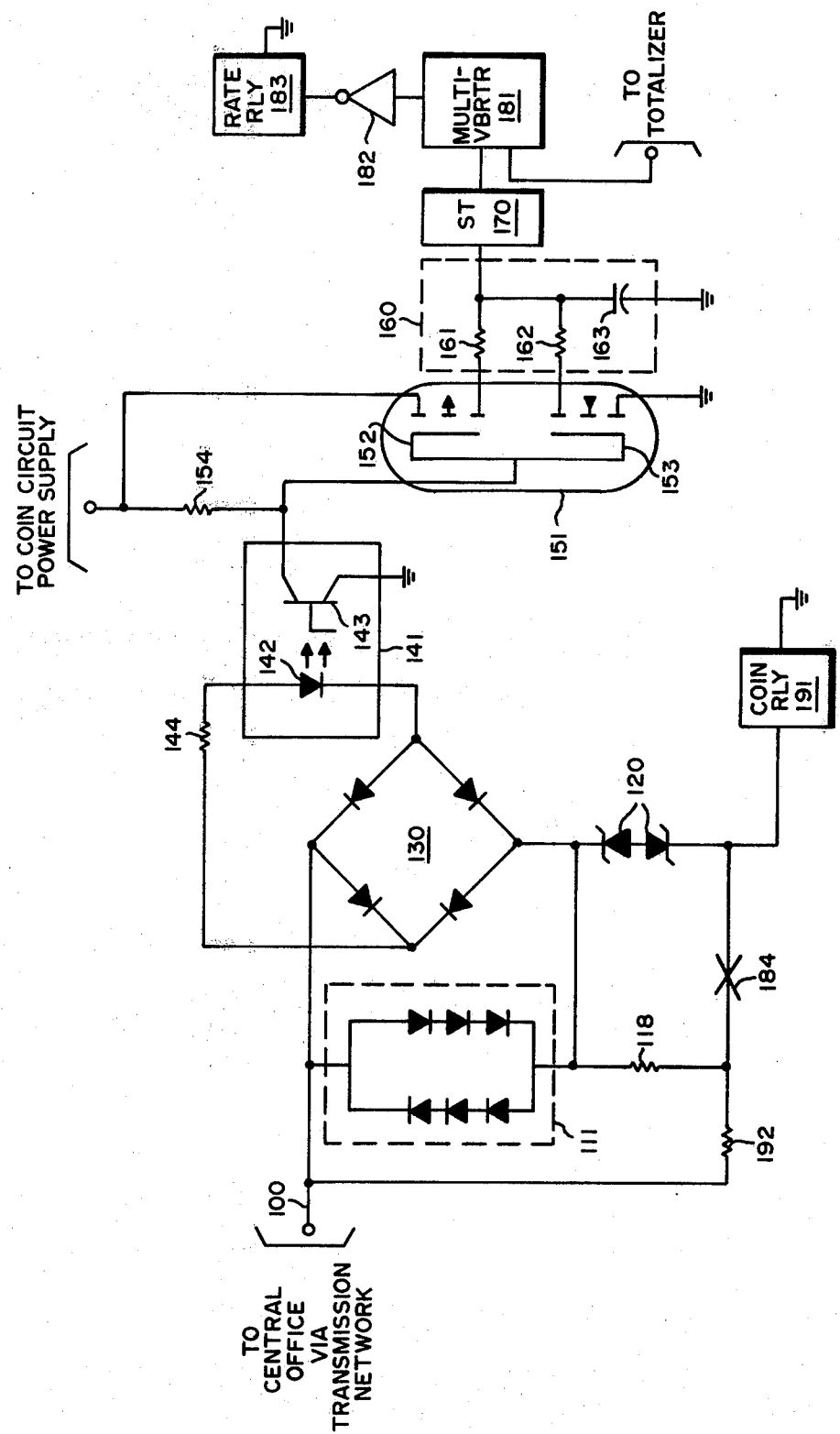

INITIAL RATE OVERRIDE CIRCUIT

BACKGROUND OF THE INVENTION (1) Field of the Invention

The present invention relates to coin telephones and more particularly to a circuit which overrides the initial rate circuit to allow operation of the coin relay independent of whether or not the initial rate has been deposited.

(2) Description of the Prior Art

Many coin telephones in current usage are designed to operate in prepay, and emergency modes of service. In the prepay mode, coins equalling at least a minimum initial rate are required to be deposited before the calling device is enabled. After the required initial rate has been deposited, the calling party can dial the called party or an operator, if this initial deposit is sufficient to place a call to the called party's location, the two parties will be connected. If the initial deposit is not sufficient, the call will be routed to an operator who will connect the two parties upon deposit of the required additional amount. Upon completion of the call or upon detection of a busy condition, the central office applies coin battery, $\times 130$ V to cause coin collection or coin refund respectively. However, in the event that the caller abandons his call after depositing coins totaling less than the required initial rate, the coin relay must be connected to the central office so it can be operated to refund the coins that have been deposited. Since the rate relay must be operated to connect the coin relay to the central office, the initial rate override circuit responds to the application of coin battery by the central office to override the initial rate circuit and operate the rate relay. The coin relay is then connected to the central office and operates in response to the coin battery to refund the deposited coins.

In the emergency coin free calling service, with the exception of predetermined telephone numbers, the initial rate must be deposited in order for the call to be completed. For predetermined numbers and calls to operators no coin deposit is required. The initial rate override circuit is needed for this mode of service to refund coins in the event that coins deposited are less than the initial rate required.

This function has traditionally been performed by including a neon lamp in a circuit between the central office and the rate relay, such that coin battery would cause the neon lamp to conduct current to the rate relay which would then be operated allowing coin battery to be applied to the coin relay. This arrangement is shown in U.S. Pat. No. 3,760,101 which issued on Sept. 18, 1973 to R.V. Burns. A more modern approach has been to use a triac which fires in response to coin battery to operate the rate relay. This approach is disclosed in U.S. Pat. No. 3,798,470 which issued on March 19, 1974 to R.V. Burns, et al. However, both of these approaches consume substantial amounts of power, are susceptible to oscillation and operation due to transients and cannot withstand high voltage transients.

Accordingly, it is the object of this invention to provide an economical, low cost, highly reliable initial rate override circuit which utilizes low-power integrated circuitry and is not susceptible to oscillation or high voltage electrical transients.

SUMMARY OF THE INVENTION

The present invention is a circuit which overrides the initial rate circuit in response to application of coin battery by the central office to the coin telephone. Upon detection of coin battery, this circuit operates the rate relay to connect the coin relay to the central office.

The initial rate override circuit includes a constant voltage circuit which includes a number of oppositely poled diodes. This constant voltage circuit is connected in parallel with a diode bridge circuit. Two oppositely poled zener diodes are connected between the bridge circuit and a coin relay, and a pair of make contacts of a rate relay are connected between the coin relay and the central office. The bridge circuit is further connected to an optical coupler, which in turn is connected to a transistor switch. This switch is further connected to the rate relay.

The initial rate override circuit operates in response to coin battery to cause current to flow through the zener diodes. As a result, a constant voltage will be dropped across the constant voltage circuit to power the optical coupler. The transistor switch operates the rate relay, in response to the optical coupler. When the rate relay contacts close, the zener diodes are shunted and substantially all of the coin battery is applied to the coin relay.

DESCRIPTION OF THE DRAWING

The single FIGURE of the accompanying drawing is a schematic diagram of an initial rate override circuit in accordance with the present invention.

DESCRIPTION OF THE PREFERRED EMBODIMENT

Referring to the accompanying drawing, the initial rate override circuit of the present invention is shown connected to an initial rate deposit circuit including rate relay multivibrator 181, rate relay driver 182, rate relay coil 183 and rate relay make contacts 184. It is also connected to coin relay 191, and resistor 192.

The initial rate override circuit includes a constant voltage circuit 111 connected in parallel with a series combination of resistors 118 and 192. Zener diodes 120 are connected between the voltage control circuit 111 and the coin relay 191, and the series combination of resistor 118 and zener diodes 120 is connected in parallel with rate relay make contacts 184. Constant voltage circuit 111 is further connected in parallel with diode bridge circuit 130 whose output is connected to optical coupler 141 via resistor 144. Complimentary configured field effect transistors 151 are connected between optical coupler 141 and transient suppression circuit 160, which includes resistors 161 and 162 and capacitor 163. Transient suppression circuit 160 is connected to a Schmitt trigger circuit 170 which is connected to the rate relay coil 183 via multivibrator 181 and relay driver 182 all of which are included in the initial rate deposit circuit.

Operation of the initial rate override circuit of the present invention will be understood by reference to the following, wherein; initially the central office will apply coin battery to lead 100.

The zener diodes 120 prevent the coin relay 191 from operating due to voltages less than coin battery, when rate relay contacts 184 are open. When contacts 184 are closed the zener diodes 120 are shunted.

The zener diodes 120 detect the presence of coin battery on lead 100 through resistors 118 and 192. Since this voltage is above the threshold of the zener diodes 120 they conduct and current flows through them, and resistors 118 and 192, to ground via coin relay 191.

When the current flow through resistors 118 and 192 is sufficient to cause a voltage drop equal to approximately 2 volts, constant voltage diodes 111 will conduct current and clamp the voltage drop across resistors 118 and 192 at approximately 2 volts.

These voltage drops are greater than the voltage drop of the bridge circuit plus the voltage drop of the light emitting diode 142 of optical coupler 141. Resistor 144 limits current through light emitting diode 142 to a safe value. The optical coupler protects the remaining circuitry of the initial rate override circuit by electrically isolating it from the input circuit since light rather than electricity couples the light emitting diode 142 to the photo-transistor 143. Therefore, when coin battery is applied to lead 100, optical coupler 141 will turn on.

Complimentary configured field effect transistors 151 operate such that the N-channel transistor 153 is on when the P-channel transistor 152 is off and vice versa. This alternate on-off status coupled with the high input impedance of the field effect transistors results in a low power switching device.

When optical coupler 141 is on, the P-channel transistor 152 turns on and charges capacitor 163 via resistor 161. When optical coupler 141 is off, the N-channel transistor 153 turns on and discharges capacitor 163 via resistor 162. These two resistors, 161 and 162, along with capacitor 163 provide resistor-capacitor time delays for charging and discharging capacitor 163. Therefore, the voltage across capacitor 163 will not change in response to short duration changes in the on-off status of current flow through optical coupler 141.

Schmitt trigger circuit 170 operates in response to the voltage across capacitor 163 rising or decaying to a threshold switching voltage of the Schmitt trigger circuit. This provides further transient suppression in addition to those of resistor-capacitor circuit 160. When capacitor 163 reaches the turn on threshold of Schmitt trigger circuit 170, it turns on and causes the rate relay circuit 180 to close make contacts 184. This results in zener diodes 120 being shunted and substantially all of the coin battery is applied to the coin relay 191 to cause coin collection or coin refund.

With contacts 184 closed, resistor 118 is no longer in series with resistor 192. Resistor 192 now effectively shunts additional current away from the light emitting diode 142, which momentarily turns off photo-transistor 143. Consequently, P-channel transistor 152 turns off and N-channel transistor 153 turns on, discharging capacitor 163 through resistor 162. This resistor-capacitor combination provides a delayed response to transistor 152 turning off. If no delay was provided, Schmitt trigger 170 would turn off, rate relay coil 183 would release and rate relay contacts 184 would open. Current would again flow through zener diodes 120, optical coupler 141 would turn on and Schmitt trigger circuit 170 would operate rate relay coil 183. Therefore, an unstable feedback condition would exist, leaving contacts 184 in an unknown state.

Resistor-capacitor combination 162 and 163 circumvents this problem by discharging at a slow enough rate that Schmitt trigger circuit 170 remains "on" and contacts 184 remain closed until the current flowing through coin relay 191, which is steadily rising, reaches a sufficiently high value to again saturate photo-transistor 143.

The present initial rate override circuit provides a highly reliable, low power, transient tolerant means of allowing the central office to perform coin disposal functions when coins totaling the initial rate have not been deposited.

It will be obvious to those skilled in the art that numerous modifications of the present invention can be made without departing from the spirit of the invention which shall be limited only by the scope of the claims appended hereto.

What is claimed is:

1. An initial rate override circuit for use in a coin telephone, including a coin control circuit connectable in series through an initial rate deposit circuit and a first current limiting means, to a telephone central office, said initial rate override circuit comprising:

voltage control means connected in parallel with said first current limiting means;

first isolation means connected between said voltage control means and said coin control circuit, operated in response to an application of coin battery to said coin telephone by said central office to provide continuity between said voltage control means and said coin control circuit, allowing current to flow through said voltage control means; said voltage control means operated in response to said current flow; and switching means connected between said voltage control means and said initial rate deposit circuit, operated in response to operation of said voltage control means, to operate said initial rate deposit circuit to connect said coin control circuit to said central office via said first current limiting means.

2. An initial rate override circuit as claimed in claim 1, wherein: said isolation means is further operated in response to an absence of said coin battery to isolate said coin control circuit from said central office, preventing current flow through said voltage control means.

3. An initial rate override circuit as claimed in claim 1, wherein: said voltage control means comprise constant voltage means operated in response to current flow through said constant voltage means to generate a constant voltage drop across said constant voltage means.

4. An initial rate override circuit as claimed in claim 3, wherein: said constant voltage means comprise a plurality of series connected diodes each connected in parallel with an oppositely poled diode.

5. An initial rate override circuit as claimed in claim 3, wherein: said voltage control means further include second current limiting means connected between said constant voltage means and said first current limiting means, operated in response to non-operation of said initial rate circuit to provide a shunt path across said constant voltage means to develop a threshold voltage drop in response to current flow through said first and second current limiting means; and said constant voltage means clamping said voltage drop at said threshold voltage by shunting excess current from said first and second current limiting means.

6. An initial rate override circuit as claimed in claim 4, wherein: said second current limiting means comprise a resistor.

7. An initial rate override circuit as claimed in claim 1, wherein: said isolation means comprise a voltage controlled switching device.

8. An initial rate override circuit as claimed in claim 1, wherein: said isolation means comprise two oppositely poled zener diodes connected in series.

9. An initial rate override circuit as claimed in claim 3, wherein: said switching means comprise a switching device;
- current directional means connected in parallel with said constant voltage means operated in response to said voltage dropped across said constant voltage means to generate unidirectional current;
- second isolation means connected between said current directional means and said switching device, operated in response to a first threshold level of said unidirectional current to provide current flow to said switching device, and further operated in response to a second threshold level of said unidirectional current to block current flow to said switching device; and
- said switching device further connected to said initial rate circuit, operated in response to said second isolation means to operate said initial rate circuit.

10. An initial rate override circuit as claimed in claim 9, wherein: said current directional means comprise a diode bridge circuit.

11. An initial rate override circuit as claimed in claim 9, wherein: said second isolation means comprise a optical coupler.

12. An initial rate override ciruit as claimed in claim 9, wherein: said switching device comprises a complementary pair of field effect transistors connected to said second isolation means, operated in response to said current flow from said second isolation means to generate a signal of a first characteristic and further operated in response to blocking of said current flow by said second isolation means to generate a signal of a second characteristic;
- transient suppression means connected to said switching device, operated in response to said signal of said first characteristic to generate a first time varying signal and further operated in response to said signal of said second characteristic to generate a second time varying signal; and
- threshold switching means connected between transient suppression means and said initial rate deposit circuit, operated in response to said first time varying signal exceeding a predetermined level to operate said initial rate deposit circuit.

13. An initial rate override circuit as claimed in claim 12, wherein: said transient suppression means comprise a pair of resistors each connected to one of said transistors and to said threshold switching means and a capacitor connected to said threshold switching means.

14. An initial rate override circuit as claimed in claim 12, wherein: said threshold switching means comprise a Schmitt trigger circuit.

* * * * *